US012676563B2

(12) United States Patent
King et al.

(10) Patent No.: US 12,676,563 B2
(45) Date of Patent: Jul. 7, 2026

(54) HIGH POWER GRINDING TOOL

(71) Applicant: Black & Decker Inc., New Britain, CT (US)

(72) Inventors: Christopher T. King, Catonsville, MD (US); Daniel F. Nace, Towson, MD (US); James H. Stiles, III, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 270 days.

(21) Appl. No.: 18/232,903

(22) Filed: Aug. 11, 2023

(65) Prior Publication Data

US 2024/0009794 A1 Jan. 11, 2024

Related U.S. Application Data

(63) Continuation-in-part of application No. 17/412,448, filed on Aug. 26, 2021, and a continuation-in-part of
(Continued)

(51) Int. Cl.
*H02P 3/06* (2006.01)
*B24B 23/02* (2006.01)
(Continued)

(52) U.S. Cl.
CPC .............. *H02P 3/06* (2013.01); *B24B 23/028* (2013.01); *B25F 5/00* (2013.01); *H02P 7/00* (2013.01)

(58) Field of Classification Search
CPC . H02P 3/06; H02P 7/00; B24B 23/028; B25F 5/00
See application file for complete search history.

(56) References Cited

U.S. PATENT DOCUMENTS 2,830,560 A 4/1958 Doeden
3,912,411 A 10/1975 Moffat
(Continued)

FOREIGN PATENT DOCUMENTS

DE 3012836 C2 9/1985
DE 8414271 U1 9/1985
(Continued)

OTHER PUBLICATIONS

EP EESR, dated Dec. 20, 2021 in corresponding EP application 21193291.8.
(Continued)

*Primary Examiner* — Nathaniel C Chukwurah
(74) *Attorney, Agent, or Firm* — Amir R. Rohani

(57) ABSTRACT

A power tool is provided including a motor having an axial length of smaller than or equal to 65 mm and an outer diameter of smaller than or equal to 63 mm. The electric motor is configured to produce a maximum power output of greater than or equal to 2800 watts when the battery pack coupled to the battery receiver has a nominal voltage output of smaller than or equal to 60 volts and a rated capacity of approximately 9 ampere-hours (A.h.). Further, the motor drives an output spindle so as to maintain an output rotational speed of greater than 3,500 rotations-per-minute (RPM) within a torque range of 30 inch-lbs to 45 inch-lbs and exhibit a drop in the output rotational speed that is less than or equal to approximately 11.5% as the torque increases from 30 inch-lbs to 45 inch-lbs.

17 Claims, 14 Drawing Sheets

Related U.S. Application Data application No. 17/948,356, filed on Sep. 20, 2022, now Pat. No. 12,266,918.

(60) Provisional application No. 63/071,416, filed on Aug. 28, 2020.

(51) Int. Cl.
*B25F 5/00* (2006.01)
*H02P 7/00* (2016.01)

(56) References Cited

U.S. PATENT DOCUMENTS

| | | | |
|---|---|---|---|
| 4,622,779 A | 11/1986 | Schadlich | |
| 4,637,170 A | 1/1987 | Block | |
| 4,980,994 A | 1/1991 | Helm et al. | |
| 5,464,365 A | 11/1995 | Kirn | |
| 5,545,078 A | 8/1996 | Schulz et al. | |
| 6,320,286 B1 | 11/2001 | Ramarathnam | |
| 6,979,254 B1 | 12/2005 | Huber | |
| 7,192,338 B2 | 3/2007 | Kausch et al. | |
| 8,573,324 B2 | 11/2013 | Turner et al. | |
| 8,776,657 B2 | 7/2014 | Menze | |
| 9,033,767 B2 | 5/2015 | Schadow | |
| 9,073,127 B2 | 7/2015 | Esenwein | |
| 9,073,186 B2 | 7/2015 | Kusakawa | |
| 9,399,278 B2 | 7/2016 | Kuether | |
| 10,411,558 B2 | 9/2019 | Forster et al. | |
| 10,549,396 B2 | 2/2020 | Matsunaga et al. | |
| 10,659,803 B2 | 5/2020 | Chen et al. | |
| 10,883,660 B2 | 1/2021 | Nishimiya et al. | |
| 10,903,775 B2 | 1/2021 | Hosokawa et al. | |
| 11,171,542 B2 | 11/2021 | Vanko et al. | |
| 2006/0181159 A1 | 8/2006 | Dehde | |
| 2007/0084613 A1 | 4/2007 | Zhang et al. | |
| 2007/0293380 A1 | 12/2007 | Kausch et al. | |
| 2011/0179931 A1 | 7/2011 | Menze | |
| 2012/0074881 A1 | 3/2012 | Pant | |
| 2012/0244788 A1 | 9/2012 | Numata | |
| 2012/0282846 A1 | 11/2012 | Kuether et al. | |
| 2012/0302147 A1 | 11/2012 | Trautner et al. | |
| 2013/0284551 A1* | 10/2013 | Nadig | F16D 63/002 |
| | | | 188/267 |
| 2014/0080387 A1* | 3/2014 | Kuether | B24B 45/00 |
| | | | 451/344 |
| 2015/0111480 A1 | 4/2015 | Vanko et al. | |
| 2016/0031072 A1 | 2/2016 | Lim et al. | |
| 2017/0110946 A1* | 4/2017 | Oktavec | H02K 9/04 |
| 2017/0190032 A1 | 7/2017 | Leong et al. | |
| 2017/0234484 A1* | 8/2017 | Vanko | B24B 23/028 |
| | | | 173/176 |
| 2017/0361416 A1 | 12/2017 | Lutz et al. | |
| 2017/0373615 A1* | 12/2017 | Lewis | H02P 6/08 |
| 2018/0079051 A1 | 3/2018 | Majcen et al. | |
| 2019/0047133 A1 | 2/2019 | Beckert et al. | |
| 2019/0262753 A1 | 8/2019 | Miura et al. | |
| 2020/0060085 A1 | 2/2020 | Coon | |
| 2020/0331138 A1 | 10/2020 | Ejiri et al. | |
| 2021/0394326 A1 | 12/2021 | Wiker et al. | |
| 2021/0394389 A1 | 12/2021 | Feng et al. | |

FOREIGN PATENT DOCUMENTS

| | | |
|---|---|---|
| DE | 3613987 A1 | 10/1987 |
| DE | 3731026 A1 | 3/1989 |
| DE | 3742430 A1 | 6/1989 |
| DE | 3731026 C2 | 3/1990 |
| DE | 3917345 A1 | 11/1990 |
| DE | 199 38 299 A1 | 3/2001 |
| DE | 102004013014 A1 | 10/2005 |
| DE | 102006001986 A1 | 7/2007 |
| DE | 102008015955 A1 | 8/2009 |
| DE | 102011005952 A1 | 9/2012 |
| DE | 202014009916 U1 | 2/2015 |
| DE | 102005047402 B4 | 2/2016 |
| DE | 202018106210 U1 | 12/2018 |
| EP | 1371450 A1 | 12/2003 |
| EP | 1398865 A2 | 3/2004 |
| EP | 1343614 B1 | 10/2004 |
| EP | 1728592 A2 | 12/2006 |
| EP | 1663574 B1 | 4/2007 |
| EP | 1597023 B1 | 10/2008 |
| EP | 1763419 B1 | 10/2009 |
| EP | 2502704 A1 | 9/2012 |
| EP | 2214866 B1 | 6/2013 |
| EP | 2632636 B1 | 1/2015 |
| EP | 2946887 A1 | 11/2015 |
| EP | 3109001 B1 | 5/2019 |
| EP | 3507517 A1 | 7/2019 |
| EP | 3363598 B1 | 10/2019 |
| EP | 3733347 A1 | 11/2020 |
| JP | 58049066 | 3/1983 |
| JP | 2010036260 A | 2/2010 |
| WO | 2005039822 A1 | 5/2005 |
| WO | 2012/126997 A1 | 9/2012 |
| WO | 2015179364 A2 | 11/2015 |
| WO | 2019130981 A1 | 7/2019 |
| WO | 2021220705 A1 | 11/2021 |

OTHER PUBLICATIONS

EP EESR, dated Feb. 1, 2022 in corresponding EP application 21193316.3.

Extended European Search Report, EP Application No. 23194964.5, Mar. 4, 2024, 7 pages, EPO.

* cited by examiner

HIGH POWER GRINDING TOOL

RELATED APPLICATION

This patent application is a continuation-in-part (CIP) of U.S. patent application Ser. No. 17/412,448 filed Aug. 26, 2021, which claims the benefit of U.S. Provisional Patent Application No. 63/071,416 filed Aug. 28, 2020, both of which are incorporated herein by reference in their entireties. This patent application is also a continuation-in-part (CIP) of U.S. patent application Ser. No. 17/948,356 filed Sep. 20, 2022, which is incorporated herein by reference in its entirety.

FIELD OF THE DISCLOSURE

This disclosure relates to power tools and in particular to grinding power tools.

BACKGROUND

Motorized power tools including grinders require a cooling fan to cool the motor and electronics components that control flow of current to the motor. A series of air intakes and outlets are provided in the tool housing, allowing the fan to generate an airflow for effective cooling of these elements. In some designs, air intakes are provided near the foot of the tool to create a substantially linear airflow path through the power tool.

In applications such as grinders, where high concentration of debris contaminates the air in the vicinity of the power tool, screens or air filters may be provided on air intake vents to filter out the contamination. While screens and filters significantly improve air quality of the airflow, small amounts of leakage dust and debris is often inevitable. What is needed is a mechanism that optimizes the airflow to reduce overall amount contamination entering through the air intake vents.

SUMMARY

According to an embodiment of the invention, a power tool is provided including a housing including a motor case and a handle portion extending from the motor case; a battery receiver configured to receive a removable battery pack disposed rearward of the handle portion; and an electric motor housed within the motor case. The electronic motor includes a stator and a rotor rotatably disposed relative to the stator to drive a rotor shaft, where the electric motor includes an axial length of smaller than or equal to 65 mm and an outer diameter of smaller than or equal to 63 mm, and the electric motor is configured to produce a maximum power output of greater than or equal to 2800 watts when the battery pack coupled to the battery receiver has a nominal voltage output of smaller than or equal to 60 volts and a rated capacity of approximately 9 ampere-hours (A.h.). The tool further includes a gear case mounted forward of the motor case and including an output spindle rotatably driven by the electric motor; and a controller configured to control a supply of electric power from the battery pack to the electric motor. The motor and the controller are configured to drive the output spindle so as to maintain an output rotational speed of greater than 3,500 rotations-per-minute (RPM) within a torque range of 30 inch-lbs to 45 inch-lbs and exhibit a drop in the output rotational speed that is less than or equal to approximately 11.5% as the torque increases from 30 inch-lbs to 45 inch-lbs.

In an embodiment, the output spindle defines a longitudinal axis and includes a threaded portion near a distal end thereof configured to receive an accessory wheel.

In an embodiment, the controller configured to apply an electronic brake to the motor to bring the output spindle from an output rotational speed of approximately 5,000 to 6,000 rotations-per-minute (RPM) to a full stop in less than approximately 2.2 seconds. In an embodiment, the power tool further comprising a wheel retention mechanism configured to apply a force to the accessory wheel when the accessory wheel is mounted on the output spindle to increase a retention force between the accessory wheel and the output spindle, wherein the wheel retention mechanism is configured to keep the accessory wheel having a mass of approximately 800 to 900 grams and a rotational inertial of approximately of $4.35 \times 10^{-3}$ kg·m$^2$ to $4.44 \times 10^{-3}$ kg·m$^2$ in engagement with the output spindle throughout a duration of the electronic brake.

In an embodiment, the gear case includes: a bevel gear in engagement with a pinion associated with the rotor shaft; an upper gear case cover extending from a front of the motor case; a lower gear case cover configured to mate with the upper case cover around the bevel gear, wherein the output spindle extends out of a lower portion of the lower gear case cover; a first bearing mounted on the output spindle and supported by the upper gear case cover; and a second bearing mounted on the output spindle and supported by the lower gear case cover.

In an embodiment, the handle portion includes a smaller diameter than the electric motor, further comprising a D-handle extending from a rear of the motor case to the battery receiver.

In an embodiment, a total axial length of the power tool is smaller than or equal to 47 cm and an outer diameter of the motor case is smaller than or equal to 9.5 cm.

In an embodiment, the motor and the controller are configured to drive the output spindle so as to maintain the output rotational speed at greater than or equal to approximately 3000 RPM for a torque level of up to approximately 80 inch-lbs.

In an embodiment, the motor and the controller are configured to drive the output spindle so as to maintain the output rotational speed at greater than or equal to approximately 3900 RPM for a torque level of up to approximately 45 inch-lbs.

In an embodiment, the speed drop in the output rotational speed of the output spindle that is less than or equal to approximately 23.5% as the torque increases from a no-load torque to approximately 45 inch-lbs.

In an embodiment, the electric motor is configured to maintain a continuous power output of the output spindle at greater than or equal to approximately 30 A for at least 500 seconds.

In an embodiment, where the accessory wheel is a cutting disc having a diameter of approximately 9 inches and a thickness of approximately $\frac{3}{32}$ inch, the power tool is capable of cutting a 2 inch by 2 inch square steel bar stock having a thickness of approximately 0.1875 inch in less than approximately 13.66 seconds with a sustained average output torque of at least 42.5 inch.lbs.

According to another aspect of the invention, a power tool is provided including a housing including an elongated body forming a motor case and a handle portion disposed rearward of the motor case; a battery receiver configured to receive a removable battery pack disposed rearward of the handle portion; an electric motor housed within the motor case. The electronic motor includes a stator and a rotor rotatably disposed relative to the stator to drive a rotor shaft around a longitudinal axis, where the electric motor includes an axial length of smaller than or equal to 65 mm and an outer diameter of smaller than or equal to 63 mm, and the electric motor is configured to produce a maximum power output of greater than or equal to 2800 watts when the battery pack coupled to the battery receiver has a nominal voltage output of smaller than or equal to 60 volts and a rated capacity of approximately 9 ampere-hours (A.h.). The power tool further includes a gear case mounted forward of the motor case and including an output spindle rotatably driven by the electric motor, wherein the output spindle includes a threaded portion near a distal end thereof configured to receive an accessory wheel, and a controller configured to control a supply of electric power from the battery pack to the electric motor and apply an electronic brake to the motor to bring the output spindle from an output rotational speed of approximately 5,000 to 6,000 rotations-per-minute (RPM) to a full stop in less than approximately 2.2 seconds. Further, the power tool includes a wheel retention mechanism configured to apply a force to the accessory wheel when the accessory wheel is mounted on the output spindle to increase a retention force between the accessory wheel and the output spindle. The wheel retention mechanism is configured to keep the accessory wheel having a mass of approximately 800 to 900 grams and a rotational inertial of approximately of $4.35 \times 10^{-3}$ kg·m$^2$ to $4.44 \times 10^{-3}$ kg·m$^2$ in engagement with the output spindle throughout a duration of the electronic brake.

BRIEF DESCRIPTION OF THE DRAWINGS

The drawings described herein are for illustrative purposes only of selected embodiments and not all possible implementations, and they are not intended to limit the scope of the present disclosure.

Corresponding reference numerals indicate corresponding parts throughout the several figures of the drawings.

DETAILED DESCRIPTION

Figure 1A:
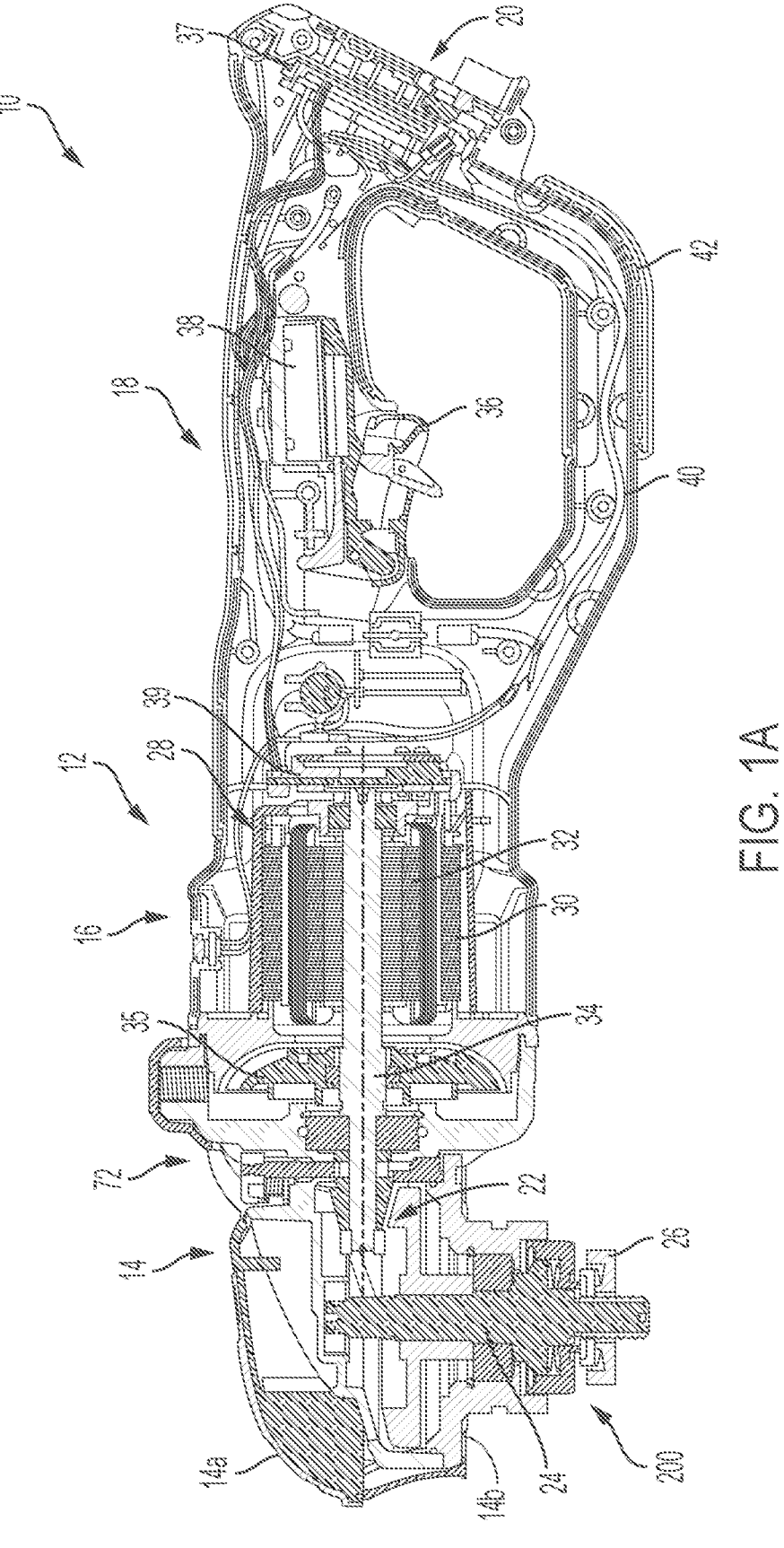
FIG. 1A is a side cross-sectional view of a power tool, according to an embodiment.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

FIG. 1A is a side cross-sectional view of a power tool 10, according to an embodiment. In an embodiment, power tool 10 is a grinding tool, particularly a large angle grinder configured for heavy grinding and cutting operations, provided including a housing 12 having a gear case 14, a motor case 16, a handle portion 18, and a battery receiver 20. Power tool 10 as shown herein is an angle grinder with the gear case 14 housing a gearset 22 that drives an output spindle 24 arranged to be coupled to a grinding or cutting disc (not shown, herein referred to as "accessory wheel"), either via threads on the disc, or via a flange (or threaded nut) 26 and guarded by a disc guard (not shown). It should be understood, however, that the teachings of this disclosure may apply to any other power tool including, but not limited to, a saw, drill, sander, and the like. Gearset 22 may include the output spindle 24 at a 90-degree angle orientation or in a linear orientation. In an embodiment, gear case 14 includes an upper gear case cover 14a and a lower gear case cover 14b that cooperatively house the gearset 22 components.

In an embodiment, the motor case 16 attaches to a rear end of the gear case 14 and houses a motor 28 operatively connected to the gear set 22. An intermediary plate or baffle may be disposed between the motor case 16 and the rear end of the gear case 14. In an embodiment, the motor 28 is a brushless direct-current (BLDC) motor having a stator 30 and a rotor 32 rotatable relative to the stator 30. The rotor 32 is mounted on a rotor shaft 34 that rotatably drives the output spindle 24 via the gearset 22. A fan 35 is mounted on the rotor shaft 34 between the motor 28 and the gear case 14, facing the intermediary plate or baffle, to generate an airflow for cooing the motor 28 and other components. The airflow generated by the fan 35 exits through an air exhaust vent 72 provided on the motor case 16 and/or the gear case 14.

In an embodiment, the stator 30 includes a stator core to which a series of stator windings are wound. In an embodiment, the stator core has an outer diameter of approximately 54 mm to 66 mm, preferably approximately 54 mm to 63 mm, preferably smaller than or equal to 63 mm. The stator windings are sequentially energized to cause a rotation of the rotor 32 thereon. The rotor 32, which includes a rotor core supporting a series of permanent magnets, magnetically interacts with the stator windings. In an embodiment, a total axial length of the motor 28 (i.e., as measured from a front end of the stator windings to a rear end of the stator windings) is smaller than or equal to 67 mm, preferably smaller than or equal to 65 mm, yet more preferably smaller than or equal to 63 mm. Detailed features of the motor 28 are disclosed in U.S. Pat. No. 10,500,708, which is incorporated herein by reference in its entirety. The size of the motor 28 is optimized to provide a high power output, as later described.

In an embodiment, the handle portion 18 extends from a rear end of the motor case 16 and includes a trigger switch 36 operatively connected to a switch assembly 38. The switch assembly 38 is in turn coupled to a control module 37 that includes a programmable controller and controls a switching operation of a power module 39. In an embodiment, the control module 37 is disposed at a rear of the handle portion 18 adjacent the battery receiver 20. The battery receiver 20 is provided at the rear end of the handle portion 18 for detachable engagement with a battery pack (not shown) to provide power to the motor 28.

In an embodiment, a second handle 40 is provided that extends from the rear end of the motor case 16 to the battery receiver 20, at least partially in parallel to the handle portion 18. In an embodiment, second handle 40 is a D-handle designed to enhance structural support for the handle portion 18 and the battery pack and improve drop performance of the power tool 10. In an embodiment, second handle 40 is provided with a bumper 42 arranged to absorb shock during drop or impact. In an embodiment, bumper 42 is made of an overmold material.

In an exemplary embodiment, the battery pack may be a 60-volt max lithium-ion type battery pack, although battery packs with other battery chemistries, shapes, voltage levels, etc. may be used in other embodiments. In various embodiments, the battery receiver 20 and battery pack may be a sliding pack disclosed in U.S. Pat. No. 8,573,324, hereby incorporated by reference. However, any suitable battery receiver and battery back configuration, such as a tower pack or a convertible 20V/60V battery pack as disclosed in U.S. patent application Ser. No. 14/715,258 filed May 18, 2015, also incorporated by reference, can be used. In an embodiment, the battery pack may have different levels of battery capacity. In an example, the battery pack may have a power capacity of 6 ampere hours (A.h.), 9 A.h., 12 A.h., 15 A.h., etc. The present embodiment is disclosed as a cordless, battery-powered tool. However, in alternate embodiments power tool can be corded, AC-powered tools. For instance, in place of the battery receiver and battery pack, the power tool 10 include an AC power cord coupled to a transformer block to condition and transform the AC power for use by the components of the power tools. Power tool 10 may for example include a rectifier circuit adapted to generate a positive current waveform from the AC power line. An example of such a tool and circuit may be found in US Patent Publication No. 2015/0111480, filed Oct. 18, 2013, which is incorporated herein by reference in its entirety.

In an embodiment, the power module 39 is disposed at a rear of the motor 28, i.e. between the motor case 16 and the handle portion 18. In an embodiment, power module 39 is a circuit board oriented radially adjacent the end of the motor 28 including a series of Field-Effect Transistors (FETs) interconnected as a multi-phase inverter circuit for powering the phases of the motor 28. In an embodiment, control module 37, switch assembly 38, and power module 39 may be provided discretely or integrated into sub-assemblies.

In an embodiment, the control module 37 uses the input from the trigger assembly 38 to set a target speed for the motor 28. This is done by controlling a pulse-width modulation (PWM) of the power switches within the power module 39. When the trigger switch 36 is released, in an embodiment, the control module 37 activates the low-side switches or the high-side switches of the power module 39 simultaneously for regenerative electronic braking of the motor 28. A description of the power and control modules and electronic braking of the motor can be found in US Patent Publication No. 2017/0234484, filed Feb. 10, 2017, which is incorporated herein by reference in its entirety.

Figure 1B:
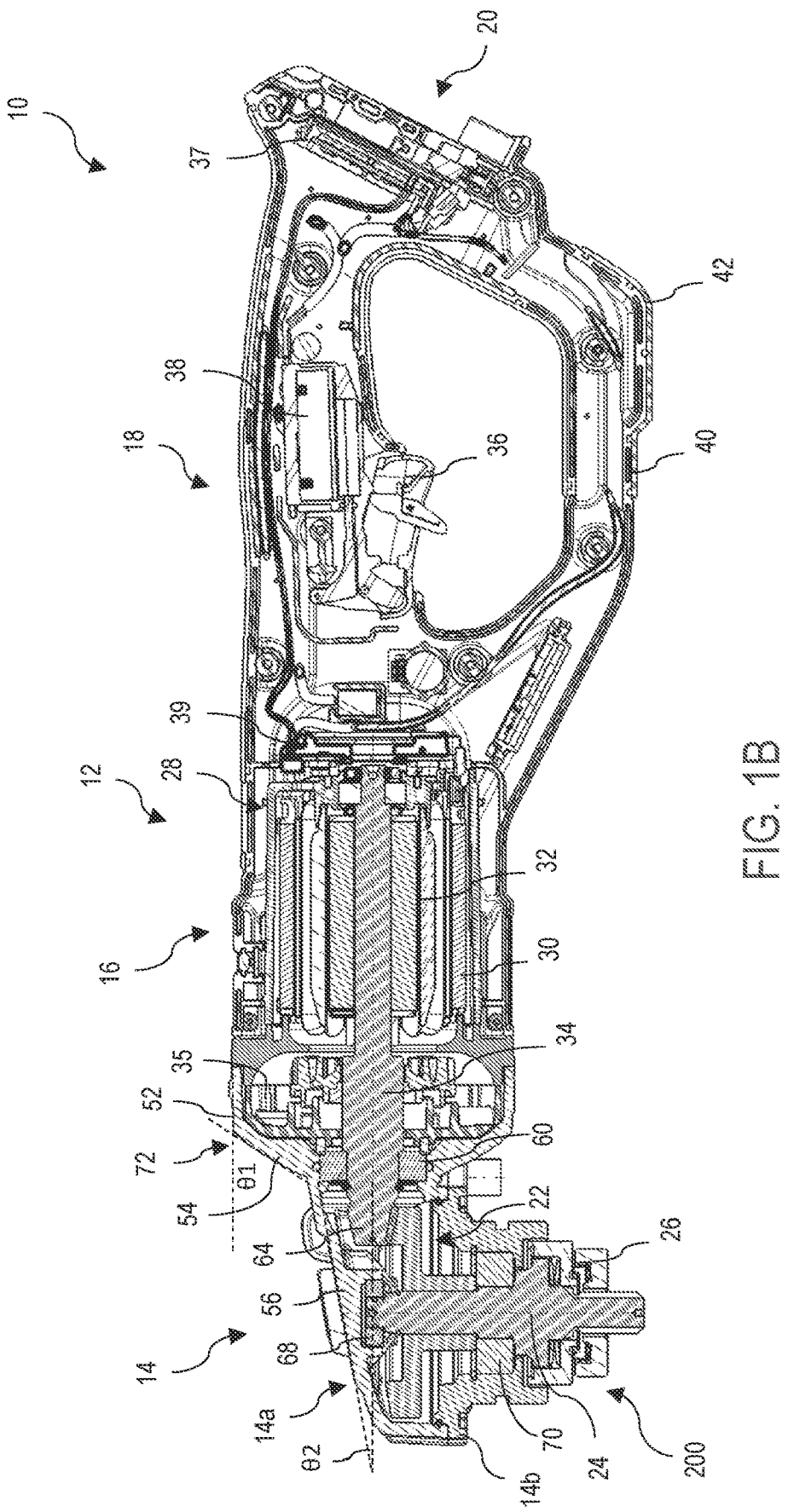
FIG. 1B is a side cross-sectional view of the power tool, according to an alternative embodiment.

FIG. 1B depicts a side cross-sectional view of power tool 10, according to an alternative embodiment. In this embodiment, gear case 14 include a more compact design in comparison to FIG. 1A. Specifically, in this embodiment, upper gear case cover 14a is designed in with an angular body that sits lower to the plane of the workpiece, allowing the operator better visibility to the workpiece. In an embodiment, upper gear case cover 14a includes a first portion 52 that mates with the front end of the motor case 16 and partially surrounds the fan 35, a second portion 54 that extends downwardly at an angle θ1 of approximately 55 to 65 degrees relative to a longitudinal axis A of the motor, and a third portion 56 that extends downwardly from a front end of the second portion 54 at an angle θ2 of approximately 15 to 30 degrees relative to the longitudinal axis A. In an embodiment, a front bearing 60 of the motor is substantially captured within the second portion 54 of the upper gear case cover 14a, and the rear end of the third portion 56 is aligned substantially close to a front end of the front bearing 60. In an embodiment, a pinion 62 at the front end of the motor shaft 34 is located within the third portion 56.

In an embodiment, gearset 22 includes a bevel gear 66 mounted on the output spindle 24 in engagement with the pinion 62 to rotatably drive the output spindle 24. Further, gearset 22 includes a first bearing 68 mounted above the bevel gear 66 and supported by the upper gear case cover 14a, and a second bearing 70 mounted below the bevel gear 66 and supported by the lower gear case cover 14b. In an embodiment, the first bearing 68 is received within a bearing pocket formed below the angular surface of the third portion 56 of the upper gear case cover 14a. In an embodiment, the longitudinal axis A of the motor intersects the first bearing 68.

The above-described arrangement provides a robust and compact gear case assembly, according to an embodiment.

Braking of the motor at high speed, either electronically or via a mechanical brake, causes rapid deceleration of the output spindle 24. Absent a mechanism to retain and protect the accessory wheel, high inertia of the accessory wheel can cause it to detach from the output spindle 24 upon rapid deceleration. For this reason, in some configurations, the nut 26 may be provided with a spring mechanism to apply an upward force on the accessory wheel to increase friction between the accessory disc and an upper flange of the power tool 10. Additionally, and/or alternatively, in some configurations, the power tool 10 may be provided with a wheel retention mechanism configured to apply a downward force on the accessory wheel to similarly increase the friction between the accessory disc and the upper flange of the power tool 10 as well as the friction between the threads of the accessory wheel and the output spindle 24, resulting in an increased accessory unseating torque. This increased friction significantly reduces the likelihood of the accessory wheel coming off the output spindle 24.

In an embodiment, a total axial length of power tool 10 is approximately in the range of 43 cm to 47 cm. The total axial length of the gear case 14 is approximately 11 cm to 12.5 cm, the length of the motor case 16 (extending from the rear end of the gear case 14 and including the power module) is also approximately 10 cm to 11.5 cm. In an embodiment, the maximum diameter of the motor case 14 is smaller than or equal to approximately 9.5 cm, preferably smaller than or equal to approximately 9.3 cm.

Figure 2:
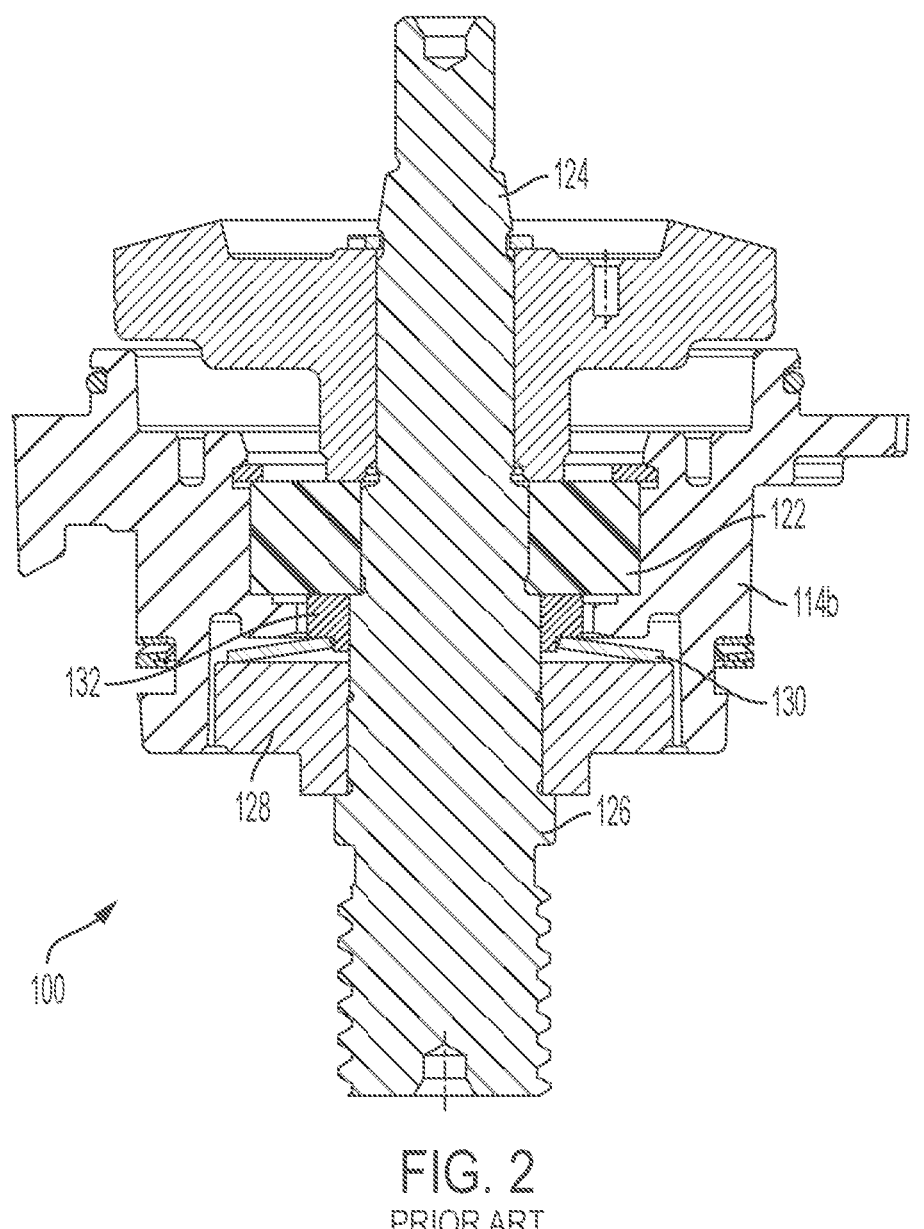
FIG. 2 is a side cross-sectional view of a conventional wheel retention mechanism.

Referring to FIG. 2, a prior art wheel retention mechanism 100 is described. Only the lower gear case cover 114b, output spindle 124, and wheel retention mechanism 100 components are illustrated in this view. In this configuration, output spindle 124 is axially fixed to the lower gear case cover 114b via a bearing 122 and includes a rim 126 disposed at a location below the bearing 122 and below a plane of the lower gear case cover 114b. Wheel retention mechanism 100 includes a transfer member 128 disposed around the output spindle 124 above the rim 126. A spring member 130 (in this example a Belleville disc) is disposed between the transfer member 128 and the bearing 122 (via a spacer 132). A backing flange (not shown) is typically mounted on the lower end of the output spindle 124 in contact with the transfer member 128. When a wheel accessory is mounted on the output spindle 124, the rotational force of the accessory as it is being tightened imparts an upward force on the transfer member 128 through the backing flange, causing the transfer member 128 to move upward relative to the output spindle 124 against the force of the spring member 130. The spring member 130 applies a downward force on the transfer member 128, thus increasing friction between the transfer member 128, the backing flange, and the wheel accessory.

In this configuration, during manufacturing and assembly, the transfer member 128 and spring member 130 are mounted over the rim 126 before the output spindle 124 is received through the bottom surface of the lower gear case cover 114b. The bearing 122 is then mounted on the output spindle 124 (e.g., by press-fitting or slip-fitting) with the spring member 130 in a preload condition. This process has been found to be slow and burdensome. In addition, since the force of the spring 130 is transferred to the bearing 122 during use, it has been found to adversely affect the press between the bearing 122 and the output spindle 124 and at times even cause displacement of the bearing 122 over time.

U.S. Pat. No. 9,399,278 is another example of a prior art wheel retention mechanism. In this configuration, a flange is mounted on the output spindle (either via threads or press-fitting) to support one end of the spring element. Thus, the force of the spring element is not transferred to the bearing. However, the transfer element is not self-supported on the output spindle and can only be mounted via a supporting flange.

The embodiment of the invention described herein overcomes the problems associated with the prior art configuration of FIG. 2, but also provides a wheel retention mechanism that is self-supported on the output spindle.

Figure 3:
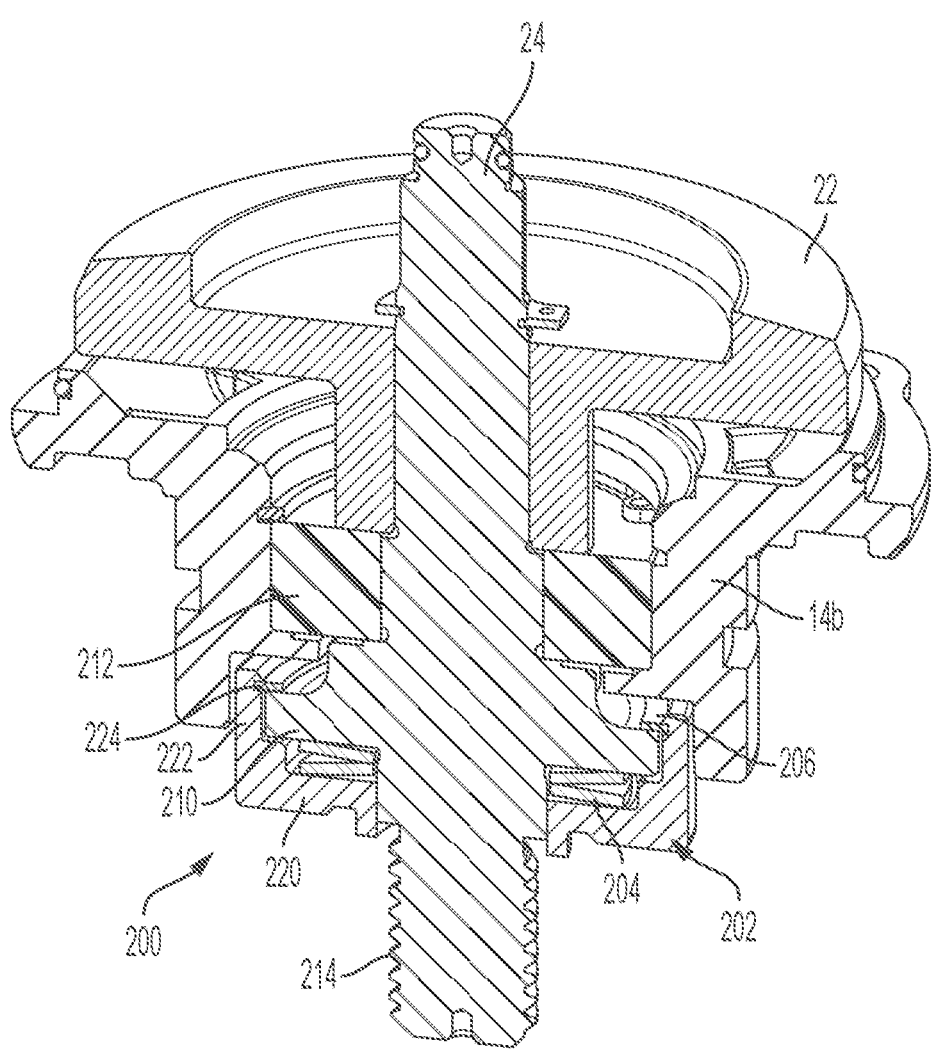
FIG. 3 depicts a perspective cross-sectional view of an improved wheel retention mechanism, according to an embodiment.

Referring to FIG. 3, wheel retention mechanism 200 includes a retention flange 202 and one or more spring elements 204. In an embodiment, retention flange 202 has a cup-shaped body that includes a main disc-shaped portion 220 having a center through-hole disposed around the output spindle 24 and a cylindrical wall 222 extending peripherally from the disc-shaped portion 220. Output spindle 24 includes an annular rim 210 below which the spring elements 204 and disc-shaped portion 220 of the retention flange 202 are disposed. Spring elements 204 are sandwiched between the annular rim 210 and the disc-shaped portion 220 of the retention flange 202. The spring members 204 are depicted in this example as a stack of Belleville discs, though it should be understood that a single Belleville disc, or an alternative form of spring such as a compression spring, may alternatively be utilized. A top portion of the cylindrical wall 222 of the retention flange 202 includes an annular recess 224 in its inner surface that receives a retaining ring 206. Retaining ring 206 sits above the annular rim 210 to axially limit the downward movement of the retention flange 202.

In an embodiment, annular rim 210 is provided at approximately the same plane as a bottom portion of the lower gear case cover 14b with a diameter that is greater than a diameter of the spring elements 204 and at least twice the diameter of the output spindle 24. A bearing 212 is provided above the annular rim 210 to axially secure the output spindle 24 to the lower gear case cover 14b. Gearset 22 is provided above the bearing 212 to rotationally drive the output spindle 24. A threaded portion 214 of the output spindle 24, to which a threaded wheel accessory or a threaded nut is fastened, is positioned below the lower surface of the retention flange 202.

Figures 4, 5:
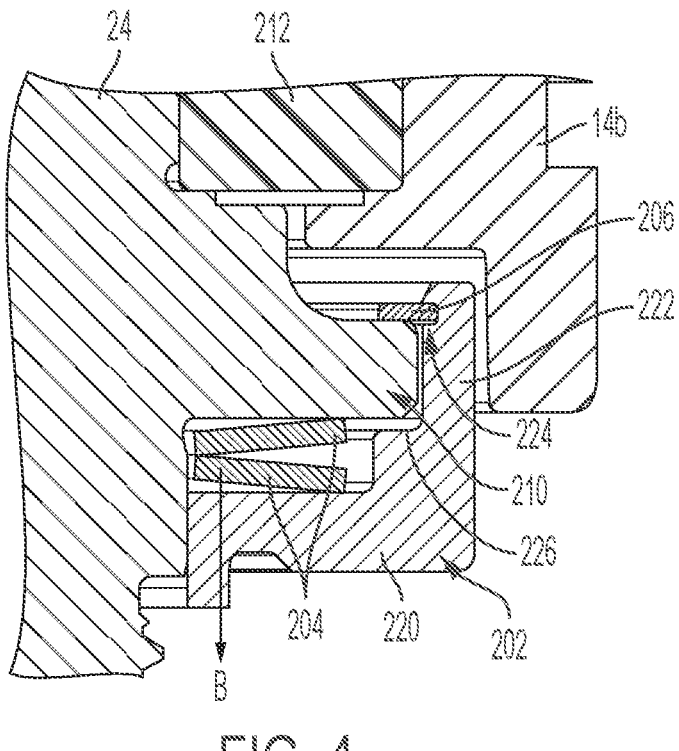
FIG. 4 depicts a partial side cross-sectional view of the wheel retention mechanism in an unmounted position, according to an embodiment.
FIG. 5 depicts a partial side cross-sectional view of the wheel retention mechanism in a mounted position, according to an embodiment.

FIG. 4 depicts a partial side cross-sectional view of the wheel retention mechanism in an unmounted position of the wheel accessory (i.e., where no accessory wheel is tightened on the threated portion 214 of the output spindle 24), according to an embodiment. In an embodiment, in the unmounted position, the spring members 204 exert a force in the direction B to the retention flange 202. The force of the spring members 204 in the direction B causes the disc-shaped portion 220 of the retention flange 202 to move away from the annular rim 210 of the output spindle 24, creating a small separation between the annular rim 210 and an annular shoulder 226 of the retention flange 202. This movement is limited by the retaining ring 206 as it meets a top portion of the annular rim 210.

FIG. 5 depicts a partial side cross-sectional view of the wheel retention mechanism in a mounted position of the wheel accessory, according to an embodiment. In an embodiment, in the mounted position, after the accessory wheel (or an intermediary flange or spacer) comes into contact with the retention flange 202, the continued fastening of the accessory wheel or the nut on the threaded portion 214 of the output spindle 24 applies a force in the direction A to the retention flange 202. Once this force is greater than the force of the spring members 204 in direction B, the retention flange 202 is moved towards the annular rim 210 until the annular shoulder 226 of the retention flange 202 comes into contact with the annular rim 210. This causes a small separation between the upper portion of the annular rim 210 and the retaining ring 206. In this position, the spring members 204 continues to apply a downward force on the retention flange 202, which increases the traction between the accessory wheel and the retention flange 202 and improve the retention of the accessory wheel on the output spindle 24.

Figure 6:
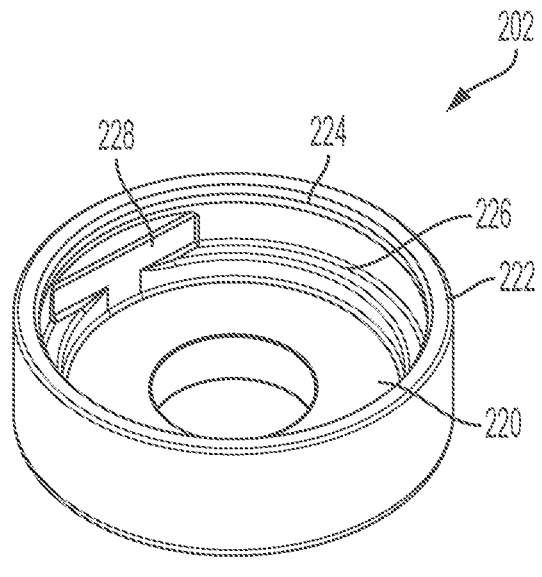
FIG. 6 depicts a perspective view of a retention flange, according to an embodiment.
Figure 7:
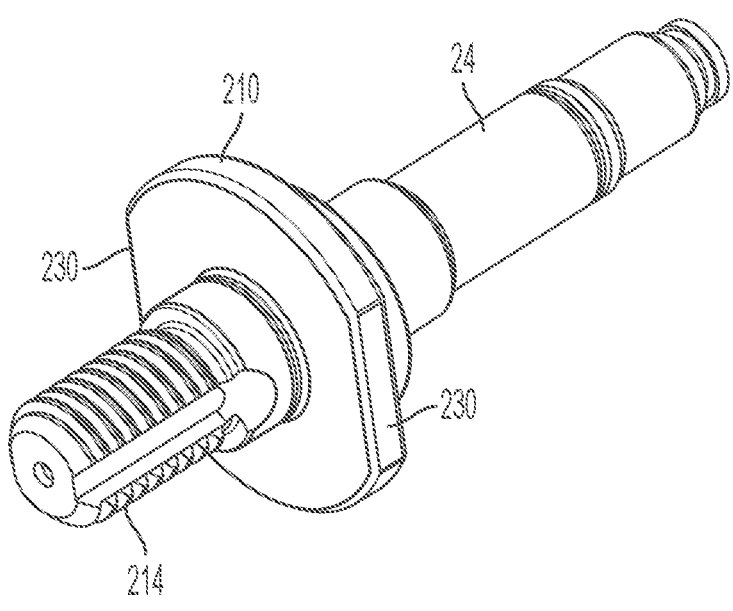
FIG. 7 depicts a perspective view of an output spindle, according to an embodiment.

FIG. 6 depicts a perspective view of the retention flange 202, according to an embodiment. FIG. 7 depicts a perspective view of the output spindle 24, according to an embodiment. As shown in these figures, retention flange 202 includes one or more flat walls 228 (in this example, two flat walls 228) provided on the inner surface of the cylindrical wall 222. The annular rim 210 of the output spindle 24 similarly includes one or more flat side portions 230 (in this example, two flat walls 228) arranged to engage the flat walls 228 of the retention flange 202. This ensures that the retention flange 202 is rotationally coupled to the output spindle 24.

Figure 8:
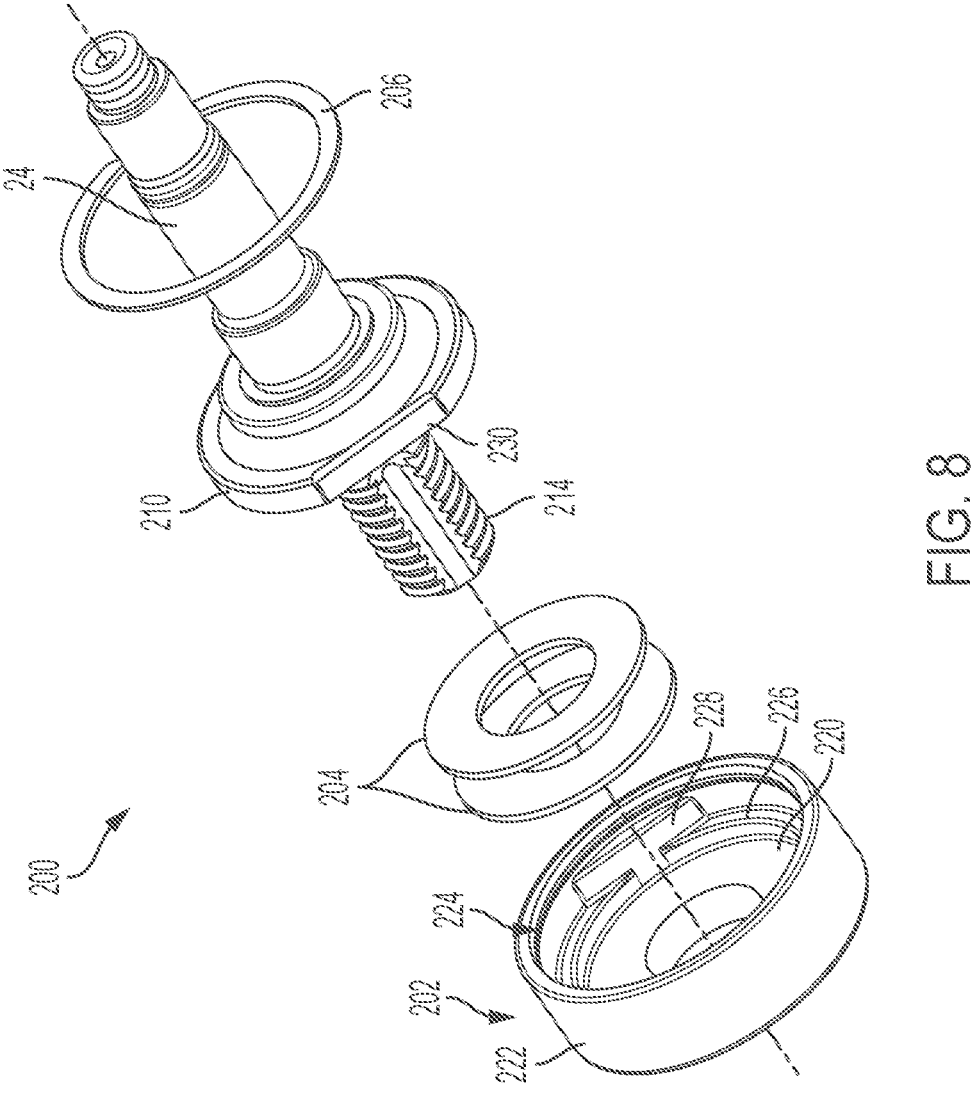
FIG. 8 depicts a perspective exploded view of the wheel retention mechanism, according to an embodiment.

FIG. 8 depicts a perspective exploded view of the wheel retention mechanism 200 described above, according to an embodiment. As seen here, and with continued reference to FIG. 3, a sub-assembly including the wheel retention mechanism 200 and the output spindle 24 may be assembled independently from the gear case 14. In an embodiment, to provide this sub-assembly, the retention flange 202 and the spring elements 204 are mounted on the annular rim 210 of the output spindle 24 and secured via the retaining ring 206. To mount the sub-assembly on the gear case 14, the output spindle 24 of the sub-assembly is received through a lower surface of the lower gear case cover 14b into the bearing 212. In an embodiment, gearset 22 is also press-fitted onto the output spindle 24.

The retention flange described above provide for a self-supporting wheel retention mechanism that can be manufactured and mounted on the output spindle as a sub-assembly prior to assembly of the output spindle into the gear case. Further, the spring force of the retention flange is transferred to the annular rim of the output spindle rather than the bearing, thus reducing wear and damage to the bearing over time.

Figure 9:
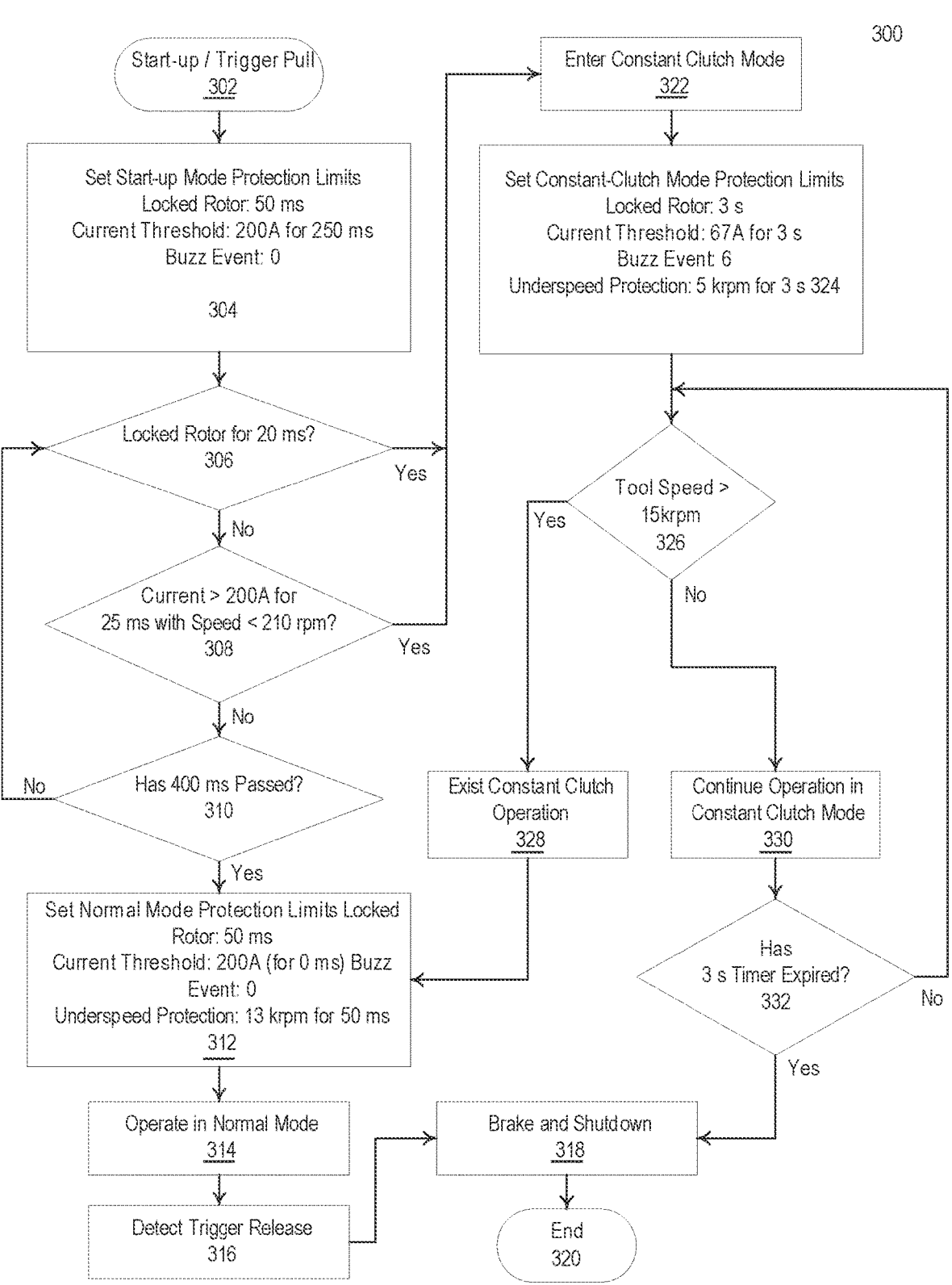
FIG. 9 depicts an exemplary process diagram for implementation of a constant-clutch mode at tool start-up, according to an embodiment.

Another aspect of the invention is described herein with reference to FIG. 9.

In an embodiment, the power tool controller may be configured to implement various protections for the power tool components and the power tool operator. One example of such protection is an anti-kickback protection. Generally, many power tools operable to perform cutting, drilling or grinding operations, may encounter an impending kickback condition due to local changes in workpiece hardness, workpiece binding, tool obstruction from burrs, and so forth. For example, when cutting a metal surface, a kickback may occur when the cutting wheel grabs or jams on a bump in the surface, which may cause the operator to lose control of the tool. Such a condition also causes a rapid rise in the output torque and a corresponding spike in the electrical current, which can damage the electronic components of the power tool if unchecked.

Various anti-kickback protection schemes for power tools have been employed over the years. One such example is U.S. Reissue Pat. RE44993E1, which is incorporated herein by reference in its entirety, and discloses a system that detects a kickback condition when the motor current exceeds a predetermined kickback current threshold, and takes protective action (e.g., by shutting down the tool) accordingly.

Other anti-kickback schemes rely on detection of a stuck rotor condition, i.e., when the rotational speed of the motor output shaft as detected by the position sensors 203 equals substantially zero for a predetermined amount of time (e.g., 50 ms), or an underspeed condition, i.e., when the rotational speed of the motor falls below a predetermined underspeed threshold that is well below the normal operating speed of the motor for a predetermined amount of time (e.g., 50 ms).

Additionally, and/or alternatively, anti-kickback schemes may rely on detection of a buzz event, i.e., when the rotor is detected to move back and forth between two adjacent rotational sectors. In an embodiment, a buzz event may occur in high-inductance and high-power motors, where the induced current of the motor may cause it to jerk backward opposite its present sector. In an embodiment, a single buzz event may be detected when the rotor is detected to move in a forward, reverse, and forward sequence between two adjacent rotational sectors. In an embodiment, detection of one or more buzz events may be indicative of stuck rotor condition necessitating the protective action for anti-kickback protection.

A problem that arises with implementation of various anti-kickback schemes is in high power and high torque power tools such as large angle grinders (LAGs). In an embodiment, due to the large size of the power tool accessory (e.g., the grinding disc or alike) commonly used for such power tools and the large amount of power required to cause the accessory to start rotating at start-up, it has been seen that engagement of the accessory with the workpiece at tool start-up may cause the current level to rise to significantly high levels so as to exceed the limit of the kickback current threshold, or accelerate the accessory so slowly that the output rotary speed of the motor falls below the underspeed threshold. The power tool thus inadvertently shuts down inadvertently at start-up even though there is no actual kickback event. Frequent occurrence of inadvertent shutdowns is frustrating to the operator and should preferably be avoided.

To solve this problem, according to an embodiment, the power tool is allowed to temporarily enter a constant-clutch mode at start-up, whereby the anti-kickback protection thresholds are modified for a set period of time (herein referred to as the "constant clutch time") until the tool achieves a normal operating speed. In an embodiment, the controller may be configured to switch from a normal start-up mode of operation to a constant-clutch mode of operation after tool start-up if it detects, for example, a stuck rotor condition for a predetermined amount of time (e.g., 20-30 ms), or a combination of high current condition (e.g., current exceeding 200A for 20-30 ms) and low speed (e.g., speed less than 300-400 rpm). In an embodiment, in the constant-clutch mode of operation, the controller may pause enforcement of at least some of the anti-kickback prevention schemes described above, or set the time limits for such enforcements to a period that is greater than or equal to the constant clutch time.

The constant-clutch mode provides tactile feedback to the operator indicative of the power tool's attempt to ramp up speed. This feature further provides the operator an opportunity to recognize the stall condition and adjust the applied bias or move the power tool away from the workpiece to reduce the load on the motor and allow it to ramp up speed. By doing so, the constant-clutch mode allows the tool to stay in a stuck rotor (stall condition) or a high current state for a longer period at a lower current limit and the operator can adjust the tool around to allow the tool to ramp, avoiding nuisance shutdowns at start-up that could occur due to the shorter duration of the protection limits.

FIG. 9 depicts an exemplary process diagram 300 for implementation of a constant-clutch mode at tool start-up, according to an embodiment. In an embodiment, process 300 start with the start-up step 302, which may occur upon the initial actuation of the power tool trigger switch. In an embodiment, in step 304, the controller sets various protection limits in a start-up mode of operation. These include, but may not be limited to, setting the stuck rotor time limit to a first stuck rotor time threshold (e.g., 30 ms to 90 ms, preferably approximately 50 ms); setting the current threshold for kickback protection to a first kickback current threshold (e.g. 150 A to 250 A, preferably approximately 200A) for a set amount of time (e.g., approximately 250 ms); and setting the buzz event threshold to zero. In an embodiment, in this step, the controller may be configured to clip the current to the first kickback current threshold for the set amount of time using, for example, a cycle-by-cycle current limiting scheme. An example of cycle-by-cycle current limiting is described in U.S. Pat. No. 10,411,558, which is incorporated herein by reference in its entirety.

In an embodiment, in step 306, the controller examines whether the rotor has been in a stuck rotor condition for a first set period of time (e.g., 20 ms). The controller further examined, in step 308, whether the current has exceeded the first kickback current threshold for a second set period of time (e.g., 25 ms) while the speed of the rotor is less than a minimum speed threshold (e.g., 210 rpm). If neither of these conditions are present, the controller continues on to step 310, where it continues to operate in the start-up mode until a prescribed start-up time period (e.g., 300 ms to 500 ms, preferably approximately 400 ms) has passed.

In an embodiment, in step 312, after the conclusion of the start-up mode, the controller sets the various protection limits in the normal mode of operation. In an embodiment, these protection limits may be similar to those set for start-up time, though the current limit is strictly set to first kickback current threshold without an associated time margin. In an embodiment, the controller 218 may also set an underspeed protection threshold to a first speed and a corresponding first time threshold (e.g., 13 krpm for 50 ms), where if the output speed of the motor falls below the first speed for the duration of the first time threshold, the controller takes protective action to shut down the tool. The controller continues to operate in the normal mode in step 314 until it detects a trigger release in step 316. The controller than executed electronic braking of the motor in step 318 to shut down the motor. The process ends in step 320.

If the controller determines that the rotor has been in a stuck rotor condition for the first set period of time in step 306, or that the current has exceeded the first kickback current threshold for the second set period of time (e.g., 25 ms) while the speed of the rotor is less than the underspeed threshold in step 308, it proceeds to step 322 to enter the constant clutch mode of operation. Occurrence of either of these conditions is likely due to the operator attempting to engage the tool accessory with the workpiece too early during tool start-up, thus causing the motor speed to ramp up too slowly and the motor current to spike too rapidly. In an embodiment, in step 324, the controller 218 modifies at least some the various protection limits in the constant-clutch mode of operation to allow the motor speed to ramp up without shutting down the tool as a result of enforcement of the start-up mode protection limits. More importantly, in an embodiment, the controller 218 increases the time limits associated with the protection limits to a value greater than or equal to the constant clutch time period. The constant clutch time period is approximately 2 to 5 s, in this example 3 s). In an embodiment, in this step, the controller 218 is configured to set the stuck rotor time limit to the constant clutch time period; set the current threshold for kickback protection to a second kickback current threshold (e.g. less than 100 A, preferably approximately 67 A) for the constant clutch time period; set the buzz event threshold to a value greater than zero (e.g., 6), and set the underspeed protection threshold to a second speed (e.g., 5 krpm) for the constant clutch time period. These modified protection limits ensure that for at least for the duration of the constant clutch time period after the tool start-up, the power tool does not shut down due to high current draw by the motor resulting from engagement of the accessory with the workpiece.

In an embodiment, after setting the various protection limits in the constant-clutch mode of operation in step 324, the controller 218 proceeds to periodically check whether the rotational speed of the motor exceeds a normal operating speed threshold (e.g., 12 krpm to 20 krpm, preferably approximately 15 krpm) at step 326. If at any point the speed exceeds this limit, the controller 218 exists the constant clutch mode of operation in step 328 and enters the normal operation mode of step 312. Otherwise, the controller 218 remains in the constant clutch mode in step 330, until it determines that the constant clutch time period (e.g., 3 s) has expired in step 332. If the constant clutch time period expires without the output speed exceeding the normal operating speed threshold, the controller proceeds to brake and shut down the motor in step 318 and end the process in step 320.

The constant-clutch operation described above, combined with the motor size and power output, the nut retention mechanism, and other features of the power tool described herein, provides a high power tool that greatly improves user experience and effectiveness in metalworking applications. Some of the some of the performance advantages provided by power tool 10 are describe herein with reference to FIGS. 10-15. It is noted that the metrics described below are obtained when power tool 10 is coupled to power tool battery pack having a maximum voltage of 60 volts and a power capacity of approximately 9 A.h.

Figure 10:
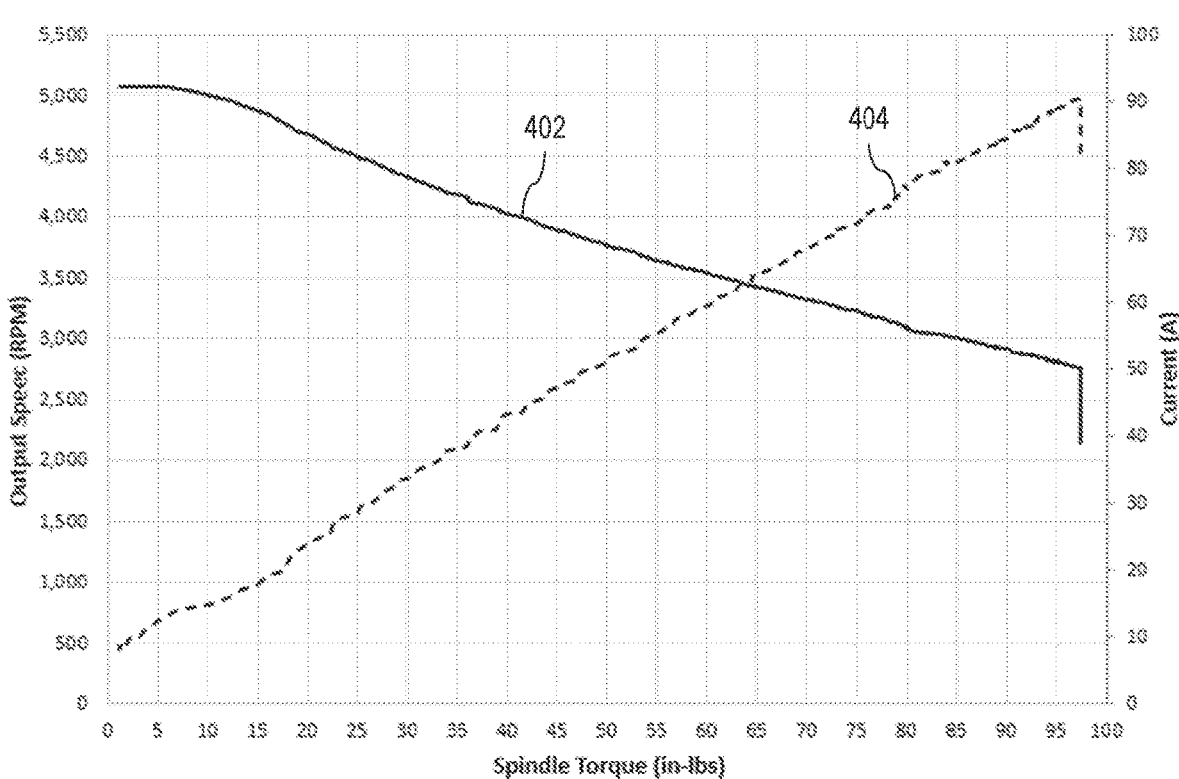
FIG. 10 depicts a diagram showing a speed-torque curve and a current-torque curve associated with the output spindle of the power tool, according to an embodiment.
Figure 11:
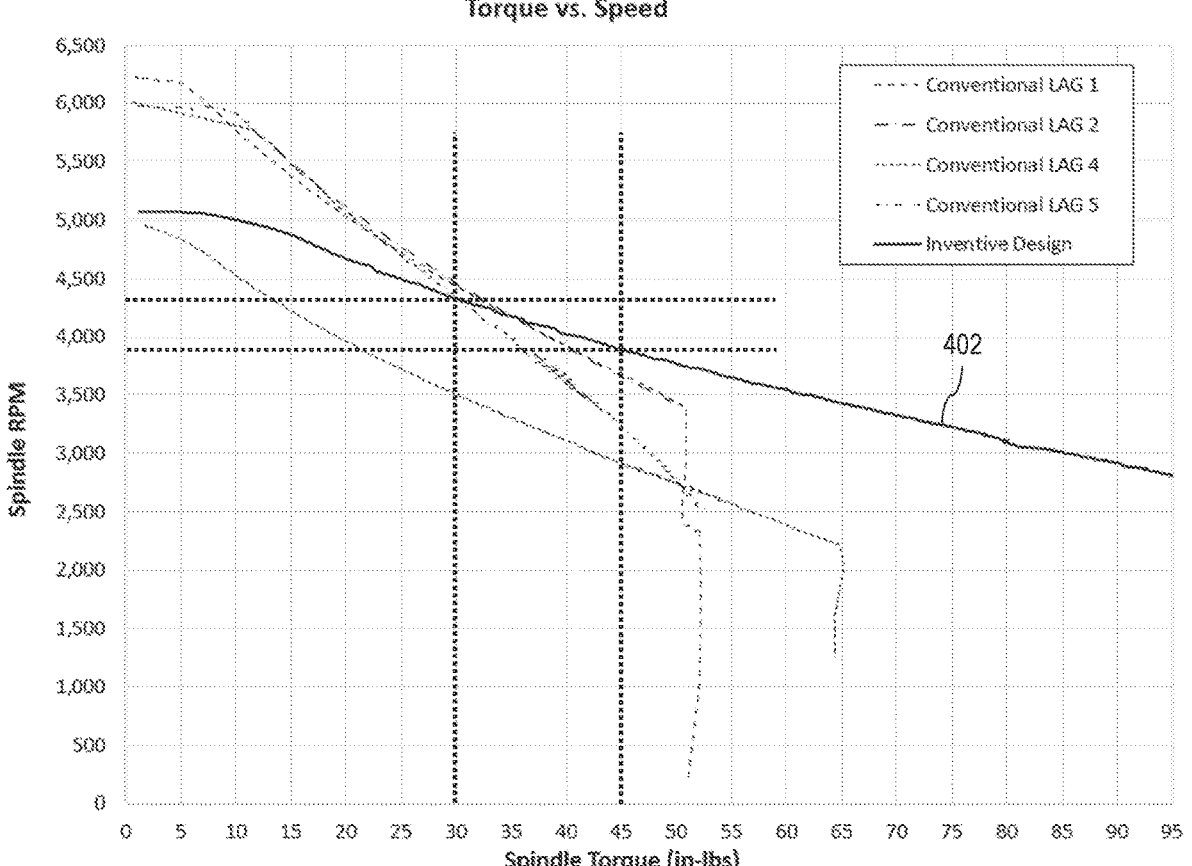
FIG. 11 depicts a diagram showing the speed-torque curve of the power tool in comparison to speed-torque curves of conventional large-angle grinders, according to an embodiment.

FIG. 10 depicts a diagram showing a speed-torque curve 402 and a current-torque curve 404 associated with the output spindle of the power tool, according to an embodiment. FIG. 11 depicts a diagram showing the speed-torque curve 402 of the power tool in comparison to speed-torque curves of conventional large-angle grinders, according to an embodiment.

As shown herein, power tool 10 of the present invention is capable of operating speeds of approximately 5000 rotations-per-minute (RPM) at no-load down to 2800 RPM at a torque level of approximately 90 inch-lbs. In particular, power tool 10 can maintain an output speed of greater than 3000 RPM up to a torque level of approximately 80 inch-lbs. None of the conventional large-angle grinders tested were capable of even operating at a torque level greater than 65 inch-lbs, let along sustain such a high output speed.

Moreover, power tool 10 can maintain a high output speed of greater than 3900 RPM from no-load up to a torque level of approximately 45 inch-lbs, which covers the most common grinding and cutting applications. None of the conventional large-angle grinders tested in this experiment can even operate at a torque level greater than 65 inch-lbs, let along sustain such a high output speed. This represents a mere speed drop of smaller than or equal to approximately 25%, preferably smaller than or equal to approximately 23.5%, i.e., approximately 22.8%, within this torque range. No other competitive product is believed to be capable of sustaining such a speed curve in metalworking grinding and cutting operations. Specifically, none of the conventional large-angle grinders tested exhibit an output spindle speed drop of smaller than approximately 35% within the torque range of no-load to 45 inch-lbs.

Furthermore, in a torque range of approximately 30 to 45 inch-lbs, which are frequently associated with the common cutting applications in metalworking, the output speed of the output spindle drops from approximately 4350 RPM to 3900

RPM. This represents a mere speed drop of smaller than or equal to approximately 13.5%, preferably smaller than or equal to approximately 11.5%, i.e., approximately 10%, within this torque range. No other competitive product is believed to be capable of sustaining such a speed curve in metalworking cutting operations. Specifically, none of the conventional large-angle grinders tested appear to exhibit an output spindle speed drop of smaller than 15% within the torque range of 30 to 45 inch-lbs.

In an embodiment, in the torque range of approximately 30 to 45 inch-lbs, the output speed of the output spindle exhibits a deceleration of approximately smaller than 16.6 rad/sec2, specifically smaller than or equal to approximately 16.35 rad/sec2, more specifically approximately 16.03 rad/sec2. By comparison, none of the conventional large-angle grinders tested appear to exhibit a deceleration of smaller than 17.5 rad/sec2.

Figure 12:
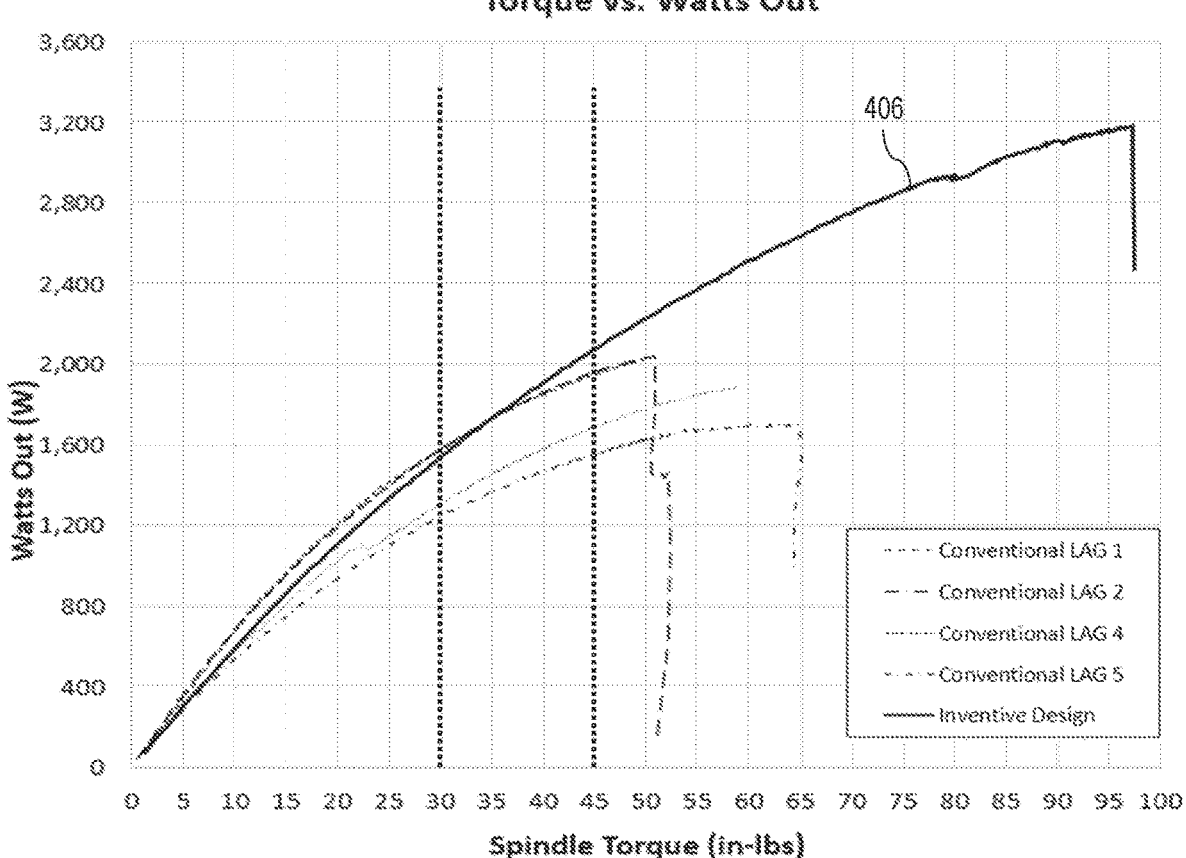
FIG. 12 depicts a diagram showing a power-torque curve associated with the output spindle of the power tool in comparison to power-torque curves of conventional large-angle grinders, according to an embodiment.

FIG. 12 depicts a diagram showing a power-torque curve 406 associated with the output spindle of power tool 10 in comparison to power-torque curves of conventional large-angle grinders, according to an embodiment. As shown here, in an embodiment, motor 28 can drive the output spindle at a power output of greater than 2000 watts at a torque level of greater than 45 inch-lbs, up to a maximum output power (max-watts-out) that reaches approximately 3200 watts. None of the conventional large-angle grinders tested appear to exhibit a maximum output power that exceeds approximately 2100 watts. This allows power tool 10 to handle many metalworking grinding and cutting operations that conventional cordless grinders are not capable of handling.

Figure 13:
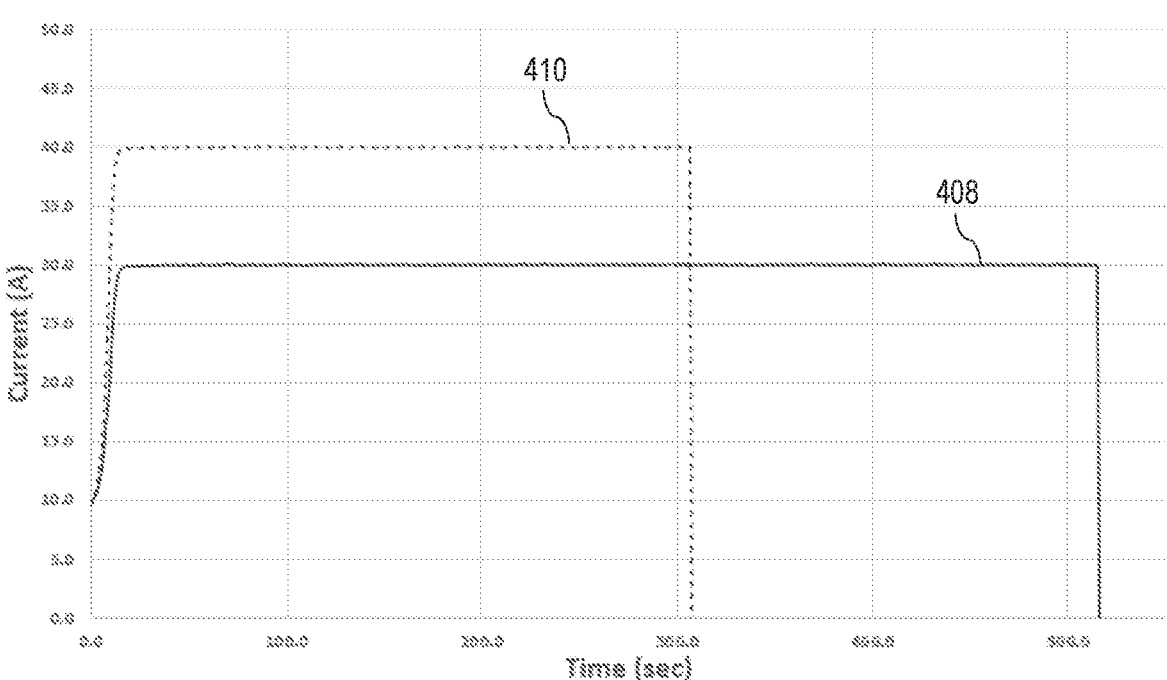
FIG. 13 depicts a diagram showing long-duration (sustained) current-time curves associated with the output spindle of the power tool, according to an embodiment.

FIG. 13 depicts a diagram showing long-duration (continuous) current-time curves 408 and 410 associated with the output spindle of power tool 10 at two torque levels, according to an embodiment. As shown here, power tool 10 is capable of maintaining an output torque of approximately 40 A for at least 300 seconds and an output torque of approximately 30 A for at least 500 seconds. No other comparable grinding tool can currently sustain such continuous torque levels.

Figure 14:
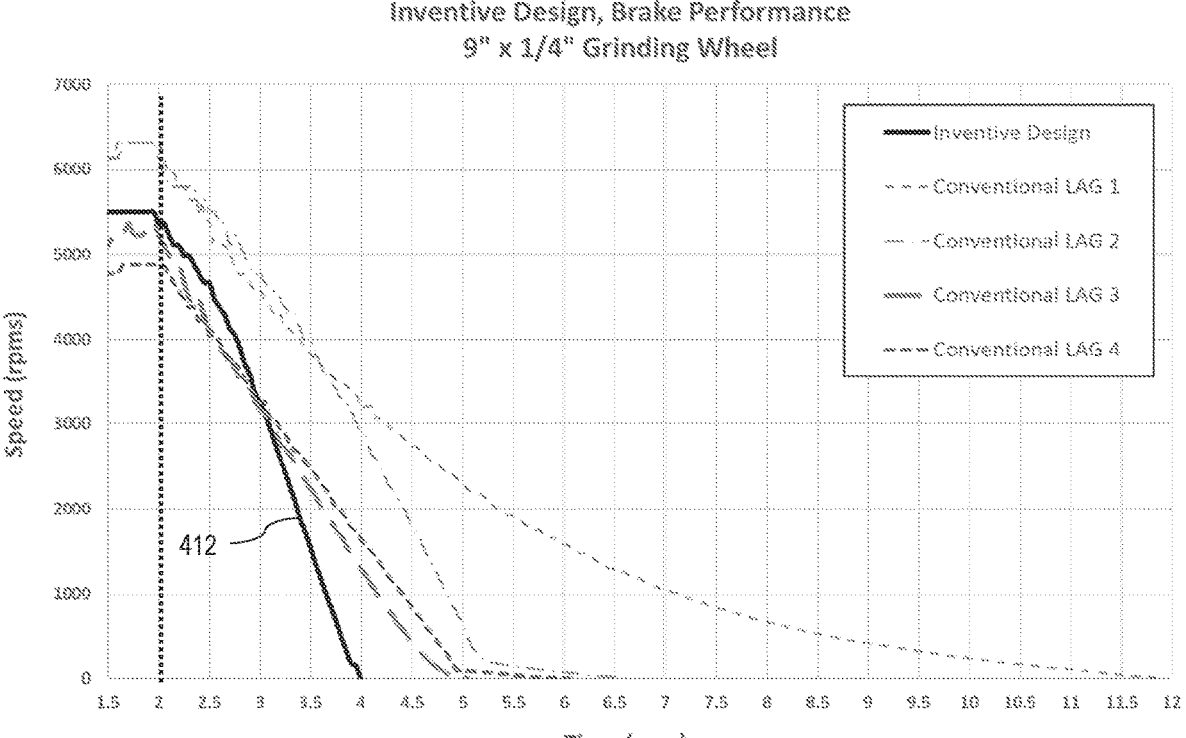
FIG. 14 depicts a diagram showing a speed—torque curve associated with the output spindle of the power tool during an electronic brake of the motor compared to conventional large-angle grinders, according to an embodiment.

FIG. 14 depicts a diagram showing a speed—torque curve 412 associated with the output spindle of the power tool during an electronic brake of the motor compared to conventional large-angle grinders, according to an embodiment. In an embodiment. In an embodiment, as shown here, when an accessory wheel is mounted on the output spindle, the wheel retention mechanism 200 described above increases a retention force between the accessory wheel and the output spindle. This allows the controller to execute an electronic braking scheme on the motor to rapidly bring the output spindle to a stop, while the wheel retention mechanism 200 retains the accessory wheel on the output spindle.

In an embodiment, the controller may implement a braking profile including a period of soft braking followed by a period of hard braking. For a detailed description of such a braking profile, reference is made to U.S. Pat. No. 11,047,528, which is incorporated herein by reference in its entirety. In an embodiment, the controller controls the braking profile so that the motor comes to a full stop in less than 2.5 seconds, preferably less or equal to approximately 2.2 seconds, preferably in less than or equal to 2.1 second, from an output speed of approximately 5000 RPM to 6000 RPM (in this example approximately 5500 RPM).

In an example, the accessory wheel is a 9"×¼" grinding accessory wheel including a mass of approximately 800 to 900 grams and a rotational inertial of approximately of 4.35×10⁻³ kg·m2 to 4.44×10⁻³ kg·m2 when mounted on the output spindle and running at an output speed of approximately 5500 RPM. In an embodiment, the accessory wheel described above is reliably maintained on the output spindle by the wheel retention mechanism 200 for the full duration of the electronic braking cycle. Absent the wheel retention mechanism 200 described in this disclosure, the high rotational inertia of the accessory wheel would likely cause the accessory wheel to continue rotating and disengage the output spindle during a rapid braking period. Further, it is believed that many conventional wheel retention mechanisms would yield a high failure rate when used on heavy accessory wheels and a rapid braking cycle. Thus, none of the conventional large-angle grinders tested appear to exhibit a braking performance from full speed to full stop in less than 2.8 seconds when using the above-described grinding accessory wheel.

Figure 15:
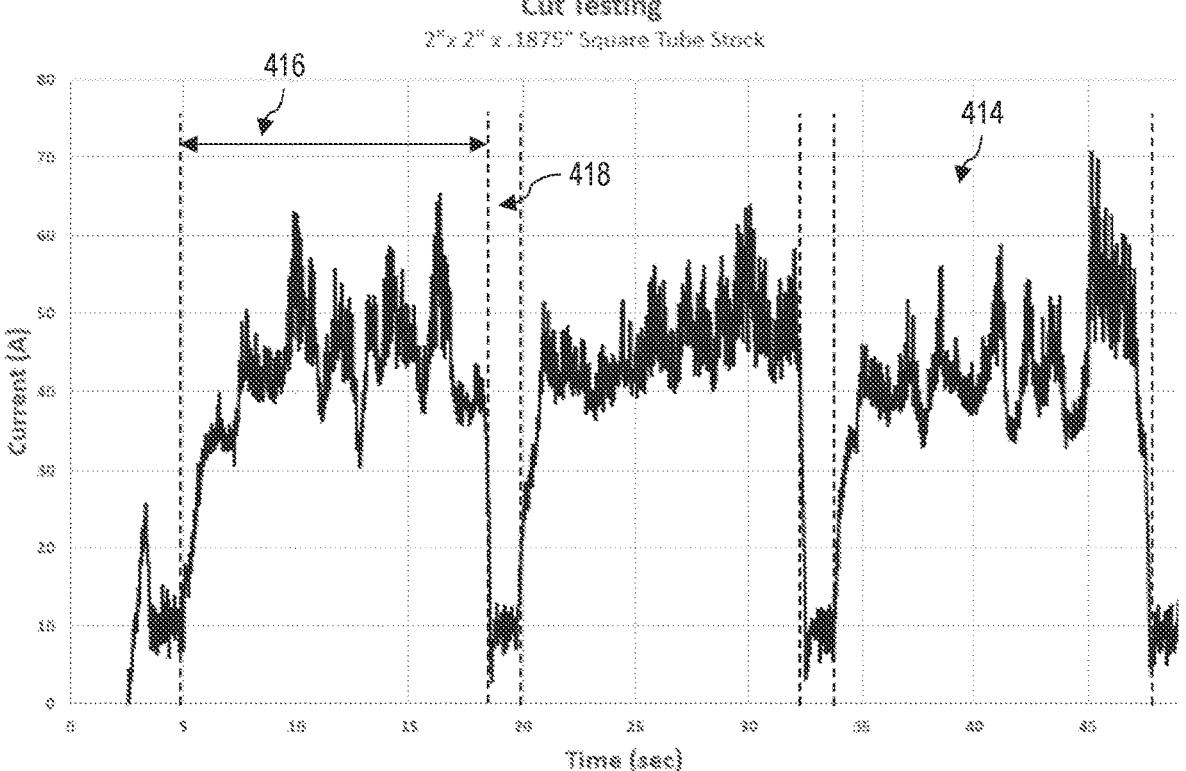
FIG. 15 depicts a diagram showing a current-time curve associated with the output spindle of the power tool during three consecutive cutting operations on a square metal tube, according to an embodiment.

FIG. 15 depicts a diagram showing a current-time curve 414 associated with the output spindle of the power tool during three consecutive cutting operations 416 on a square metal tube with small break periods 418 in between, according to an embodiment. In this example, a 2 inch by 2 inch square steel bar stock having a thickness of approximately 0.1875 inch was cut repeatedly using a cutting disc accessory having a diameter of approximately 9 inches and a thickness of approximately 3⁄32 inch. In an embodiment, power tool 10 enables each cutting operation to be completed in less than or equal to an average time of approximately 14.12 seconds, preferably less than or equal to an average time of approximately 13.66 seconds. In an embodiment, the average RMS current per cutting operation is greater than or equal to an average time of approximately 42.4 A, preferably greater than or equal to an average time of approximately 43.5 A. This represents a significant improvement in the cutting operation of power tool 10 in comparison to comparable and commonly available large angle grinding tools.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A power tool comprising:
a housing including an elongated body forming a motor case and a handle portion disposed rearward of the motor case;
a battery receiver configured to receive a removable battery pack disposed rearward of the handle portion;
an electric motor housed within the motor case, the electronic motor including a stator and a rotor rotatably disposed relative to the stator to drive a rotor shaft, wherein the electric motor includes an axial length of smaller than or equal to 65 mm and an outer diameter of smaller than or equal to 63 mm, wherein the electric motor is configured to produce a maximum power output of greater than or equal to 2800 watts when the battery pack coupled to the battery receiver has a nominal voltage output of smaller than or equal to 60 volts and a rated capacity of approximately 9 ampere-hours (A.h);
a gear case mounted forward of the motor case and including an output spindle rotatably driven by the electric motor; and
a controller configured to control a supply of electric power from the battery pack to the electric motor,
wherein, the motor and the controller are configured to drive the output spindle so as to maintain an output rotational speed of greater than 3,500 rotations-per-minute (RPM) within a torque range of 30 inch-lbs to 45 inch-lbs and exhibit a drop in the output rotational speed that is less than or equal to approximately 11.5% as the torque increases from 30 inch-lbs to 45 inch-lbs.

2. The power tool of claim 1, wherein the output spindle defines a longitudinal axis and includes a threaded portion near a distal end thereof configured to receive an accessory wheel.

3. The power tool of claim 2, wherein the controller configured to apply an electronic brake to the motor to bring the output spindle from an output rotational speed of approximately 5,000 to 6,000 rotations-per-minute (RPM) to a full stop in less than approximately 2.2 seconds, the power tool further comprising a wheel retention mechanism configured to apply a force to the accessory wheel when the accessory wheel is mounted on the output spindle to increase a retention force between the accessory wheel and the output spindle, wherein the wheel retention mechanism is configured to keep the accessory wheel having a mass of approximately 800 to 900 grams and a rotational inertial of approximately of $4.35\times10^{-3}$ kg·m² to $4.44\times10^{-3}$ kg·m² in engagement with the output spindle throughout a duration of the electronic brake.

4. The power tool of claim 1, wherein the gear case comprises:
a bevel gear in engagement with a pinion associated with the rotor shaft;
an upper gear case cover extending from a front of the motor case;

a lower gear case cover configured to mate with the upper case cover around the bevel gear, wherein the output spindle extends out of a lower portion of the lower gear case cover;
a first bearing mounted on the output spindle and supported by the upper gear case cover; and
a second bearing mounted on the output spindle and supported by the lower gear case cover.

5. The power tool of claim 1, wherein the handle portion includes a smaller diameter than the electric motor, further comprising a D-handle extending from a rear of the motor case to the battery receiver.

6. The power tool of claim 1, wherein a total axial length of the power tool is smaller than or equal to 47 cm and an outer diameter of the motor case is smaller than or equal to 9.5 cm.

7. The power tool of claim 1, wherein the motor and the controller are configured to drive the output spindle so as to maintain the output rotational speed at greater than or equal to approximately 3000 RPM for a torque level of up to approximately 80 inch-lbs.

8. The power tool of claim 1, wherein the motor and the controller are configured to drive the output spindle so as to maintain the output rotational speed at greater than or equal to approximately 3900 RPM for a torque level of up to approximately 45 inch-lbs.

9. The power tool of claim 1, wherein the speed drop in the output rotational speed of the output spindle that is less than or equal to approximately 23.5% as the torque increases from a no-load torque to approximately 45 inch-lbs.

10. The power tool of claim 1, wherein the electric motor is configured to maintain a continuous power output of the output spindle at greater than or equal to approximately 30 A for at least 500 seconds.

11. The power tool of claim 1, wherein the accessory wheel is a cutting disc having a diameter of approximately 9 inches and a thickness of approximately 3⁄32 inch, and wherein the power tool is capable of cutting a 2 inch by 2 inch square steel bar stock having a thickness of approximately 0.1875 inch in less than approximately 13.66 seconds with a sustained average output torque of at least 42.5 inch.lbs.

12. A power tool comprising:
a housing including an elongated body forming a motor case and a handle portion disposed rearward of the motor case;
a battery receiver configured to receive a removable battery pack disposed rearward of the handle portion;
an electric motor housed within the motor case, the electronic motor including a stator and a rotor rotatably disposed relative to the stator to drive a rotor shaft around a longitudinal axis, wherein the electric motor includes an axial length of smaller than or equal to 65 mm and an outer diameter of smaller than or equal to 63 mm, wherein the electric motor is configured to produce a maximum power output of greater than or equal to 2800 watts when the battery pack coupled to the battery receiver has a nominal voltage output of smaller than or equal to 60 volts and a rated capacity of approximately 9 ampere-hours (A.h);
a gear case mounted forward of the motor case and including an output spindle rotatably driven by the electric motor, wherein the output spindle includes a threaded portion near a distal end thereof configured to receive an accessory wheel;
a controller configured to control a supply of electric power from the battery pack to the electric motor and apply an electronic brake to the motor to bring the output spindle from an output rotational speed of approximately 5,000 to 6,000 rotations-per-minute (RPM) to a full stop in less than approximately 2.2 seconds; and a wheel retention mechanism configured to apply a force to the accessory wheel when the accessory wheel is mounted on the output spindle to increase a retention force between the accessory wheel and the output spindle, wherein the wheel retention mechanism is configured to keep the accessory wheel having a mass of approximately 800 to 900 grams and a rotational inertial of approximately of $4.35 \times 10^{-3}$ kg·m$^2$ to $4.44 \times 10^{-3}$ kg·m$^2$ in engagement with the output spindle throughout a duration of the electronic brake.

13. The power tool of claim 12, wherein the gear case comprises:

a bevel gear in engagement with a pinion associated with the rotor shaft;

an upper gear case cover extending from a front of the motor case;

a lower gear case cover configured to mate with the upper case cover around the bevel gear, wherein the output spindle extends out of a lower portion of the lower gear case cover;

a first bearing mounted on the output spindle and supported by the upper gear case cover; and a second bearing mounted on the output spindle and supported by the lower gear case cover, wherein the wheel retention mechanism is mounted below the lower gear case cover.

14. The power tool of claim 12, wherein the handle portion includes a smaller diameter than the electric motor, further comprising a D-handle extending from a rear of the motor case to the battery receiver.

15. The power tool of claim 12, wherein a total axial length of the power tool is smaller than or equal to 47 cm and an outer diameter of the motor case is smaller than or equal to 9.5 cm.

16. The power tool of claim 12, wherein the motor and the controller are configured to drive the output spindle so as to maintain the output rotational speed at greater than or equal to approximately 3000 RPM for a torque level of up to approximately 80 inch-lbs.

17. The power tool of claim 12, wherein the motor and the controller are configured to drive the output spindle so as to maintain the output rotational speed at greater than or equal to approximately 3900 RPM for a torque level of up to approximately 45 inch-lbs.

* * * * *